United States Patent
Hu

(10) Patent No.: US 9,939,000 B2
(45) Date of Patent: Apr. 10, 2018

(54) COAXIAL ASSEMBLY AND ASSEMBLY METHOD USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventor: An-Guo Hu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 114 days.

(21) Appl. No.: 14/753,563

(22) Filed: Jun. 29, 2015

(65) Prior Publication Data

US 2016/0195120 A1    Jul. 7, 2016

(30) Foreign Application Priority Data

Jan. 7, 2015   (CN) .......................... 2015 1 0005860

(51) Int. Cl.
*F16B 11/00*    (2006.01)
*F16B 7/04*    (2006.01)

(52) U.S. Cl.
CPC .......... *F16B 11/008* (2013.01); *F16B 7/0413* (2013.01)

(58) Field of Classification Search
CPC ........ F16B 39/10; F16B 39/282; F16B 19/02; F16B 11/002; F16B 4/004; F16B 37/065; F16B 37/068
See application file for complete search history.

(56) References Cited

U.S. PATENT DOCUMENTS

| | | | | |
|---|---|---|---|---|
| 2,949,142 A | * | 8/1960 | Sumerak | F16B 37/122 29/432 |
| 3,074,292 A | * | 1/1963 | Polmon | F16B 12/24 264/249 |
| 3,395,934 A | * | 8/1968 | Capistrano | F16L 13/16 285/211 |
| 4,571,111 A | * | 2/1986 | Keogh | F16D 1/072 16/433 |
| 4,778,321 A | | 10/1988 | Okawa | |
| 5,697,744 A | * | 12/1997 | Medal | B29C 65/08 156/73.1 |
| 5,879,115 A | * | 3/1999 | Medal | B29C 65/08 156/272.2 |

(Continued)

FOREIGN PATENT DOCUMENTS

JP   60-88110 U   6/1985
WO  2004/038235 A1   5/2004

*Primary Examiner* — Daniel J Wiley
(74) *Attorney, Agent, or Firm* — ScienBiziP, P.C.

(57) ABSTRACT

A coaxial assembly includes a first member, a second member, and at least two position members. The first member has an assembly hole with a sidewall. The second member having a lateral wall. The at least two position members are evenly arranged along a circumference of the lateral wall of the second member. The second member and assembly hole are configured such that when the second member is within the assembly hole, the at least two position members tightly abut the sidewall of the assembly hole, thereby causing the second member to be coaxial with the first member. An assembly method is also provided.

11 Claims, 5 Drawing Sheets

(56) References Cited

U.S. PATENT DOCUMENTS

| | | | | |
|---|---|---|---|---|
| 6,079,920 A | * | 6/2000 | Dispenza | F16B 37/061 |
| | | | | 411/107 |
| 6,193,456 B1 | * | 2/2001 | Stumpf | F16B 37/122 |
| | | | | 411/180 |
| 7,011,584 B2 | * | 3/2006 | Ward | B21D 53/24 |
| | | | | 470/21 |
| 9,169,864 B2 | * | 10/2015 | Colombo | F16B 39/282 |

* cited by examiner

US 9,939,000 B2

COAXIAL ASSEMBLY AND ASSEMBLY METHOD USING THE SAME

FIELD

The subject matter herein generally relates to an coaxial assembly and an assembly method using the same.

BACKGROUND

Mechanical assembly is important in machinery manufacturing. It is common that a plurality of components are required to be coaxial. A special fixture can be used to ensure that the components are assembled coaxially.

BRIEF DESCRIPTION OF THE DRAWINGS

Implementations of the present technology will now be described, by way of example only, with reference to the attached figures.

DETAILED DESCRIPTION

Figure 1:
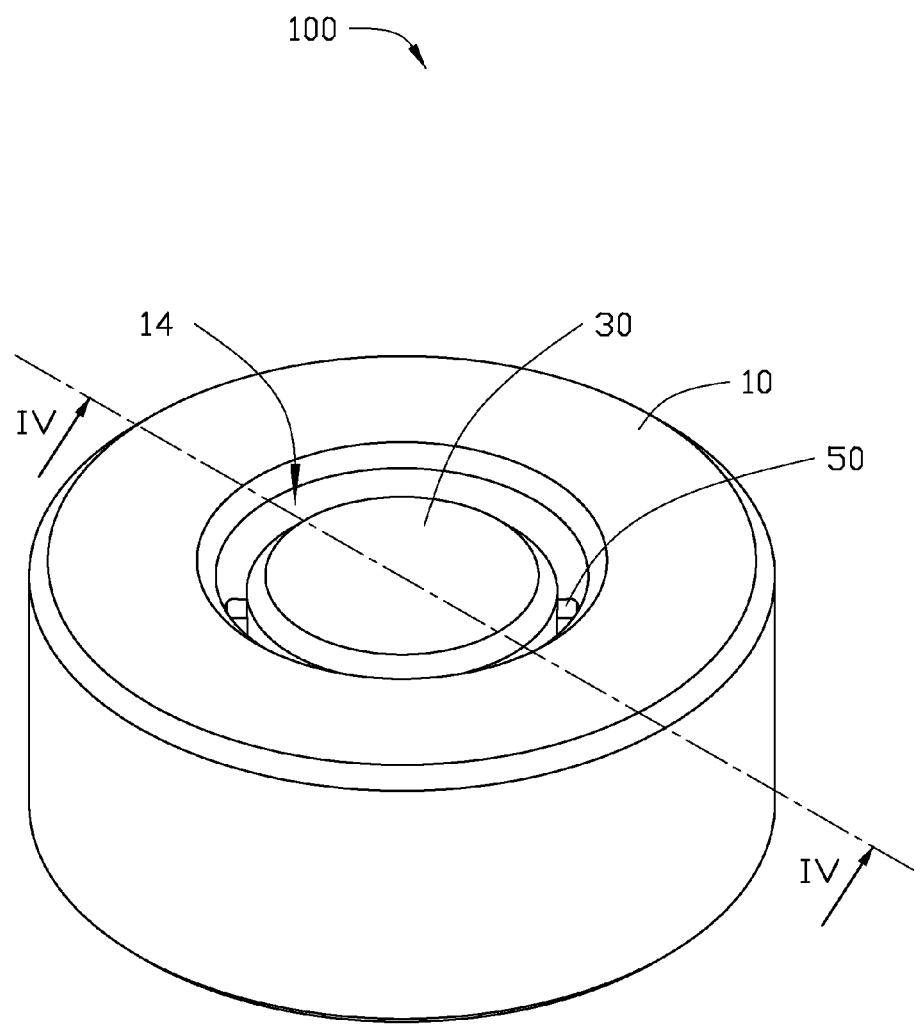
FIG. 1 is an isometric view of one embodiment of an coaxial assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an coaxial assembly and an assembly method using the same.

FIG. 1 illustrates that an coaxial assembly 100 includes a first member 10, a second member 30 received in the first member 10, and a plurality of position members 50 mounted on the side of the second member 30. The first member 10 can include a receiving hole 12 for receiving the second member 30, and the position members 50 can be located between the first member 10 and the second member 30. The first member 10 can be coaxial with the second member 30.

Figure 2:
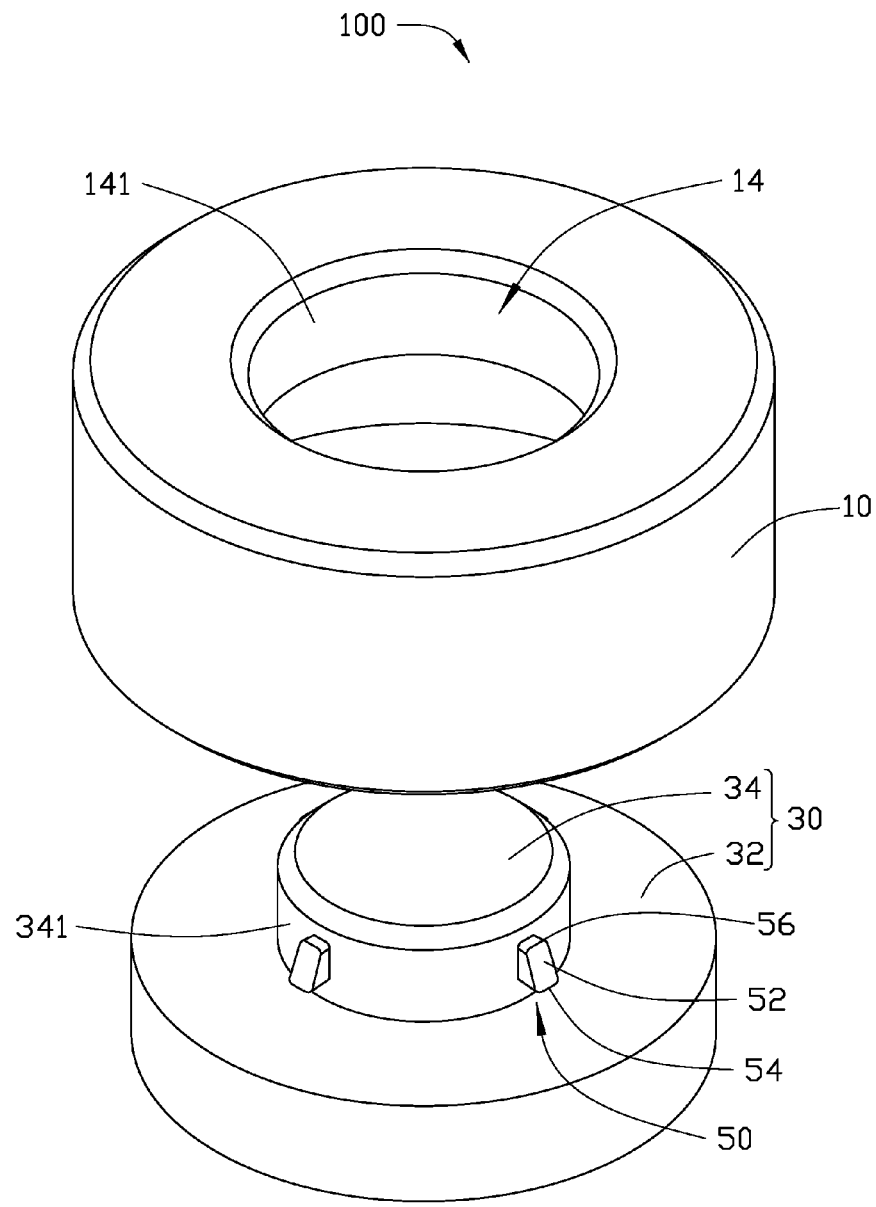
FIG. 2 is an exploded view of the coaxial assembly shown in FIG. 1.

FIG. 2 illustrates that the first member 10 can be substantially column shaped. The second member 30 can include a main body 32 and an assembly portion 34. The assembly portion 34 can extend from the centre of main body 32 and include a lateral wall 341. The main body 32 and the assembly portion 34 can be substantially column shaped. The assembly portion 34 can have a central axis 342 (shown in FIG. 4), and a diameter of the assembly portion 34 can be smaller than a diameter of the main body 32.

In at least one embodiment, the number of the position members 50 can be four, and the position members 50 can be evenly distanced from each other and along a circumference of the lateral wall of the second member 30. Each position member 50 can be substantially wedge-shaped and radially extending from the lateral wall 341 of the assembly portion 34. The position member 50 can include a guiding surface 52, an abutting end 54 at one end of the guiding surface 52 near the main body 32, and a guiding end 56 at the other end of the guiding surface 52 away from the main body 32.

The guiding surface 52 can be inclined to the central axis 342 of the assembly portion 34, and a distance between the guiding end 56 and the assembly portion 34 is smaller than a distance between the abutting end 54 of the guiding surface 52 and the assembly portion 34.

Figure 3:
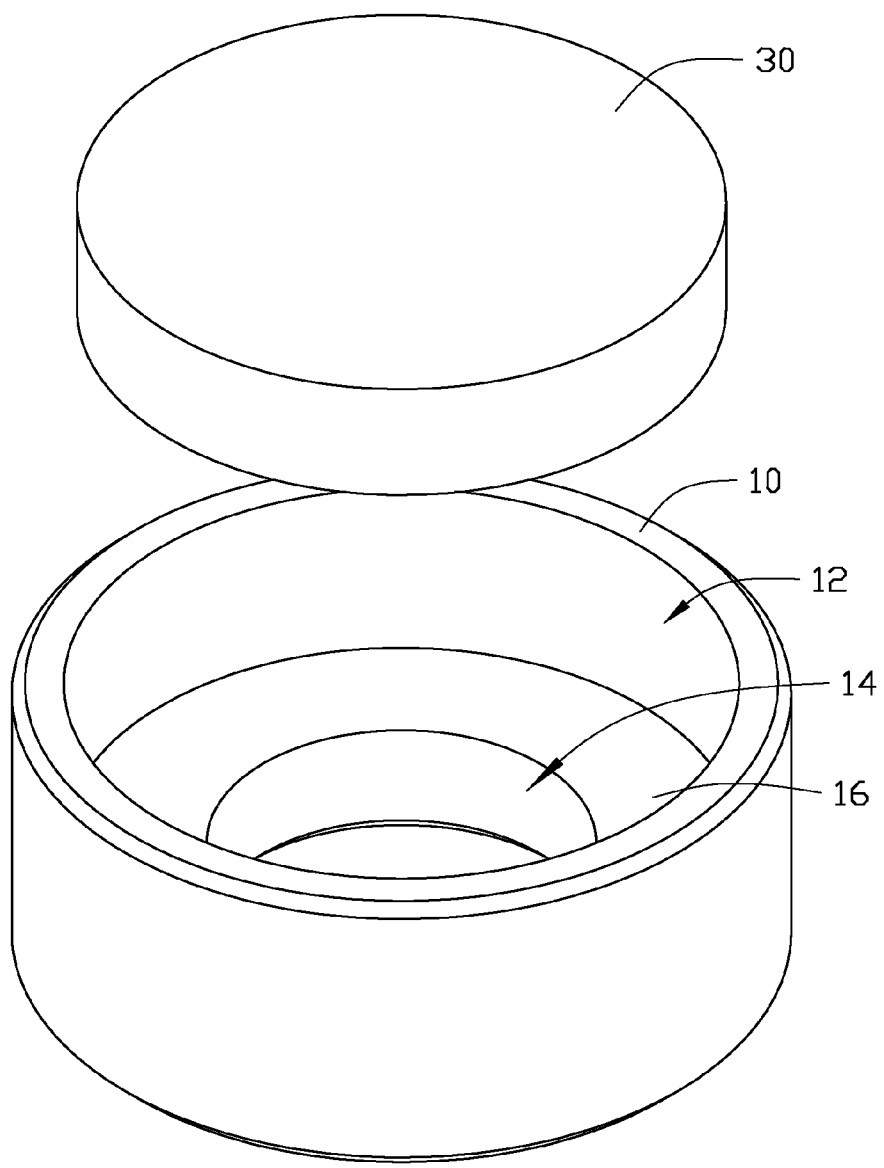
FIG. 3 is an exploded view of the coaxial assembly device shown in FIG. 1 from another angle.

FIG. 3 illustrates that the first member 10 can further define an assembly hole 14 in communication with the receiving hole 12. The assembly hole 14 can have a sidewall 141. The assembly hole 14 can be substantially coaxial with the receiving hole 12. The assembly hole 14 and the receiving hole 12 can run through opposing ends of the first member 10. A diameter of the assembly hole 14 can be smaller than a diameter of the receiving hole 12, thereby a stepped surface 16 can be formed at junction of the receiving hole 12 and the assembly hole 14. The stepped surface 16 can be configured to abut and support the second member 30.

Figure 4:
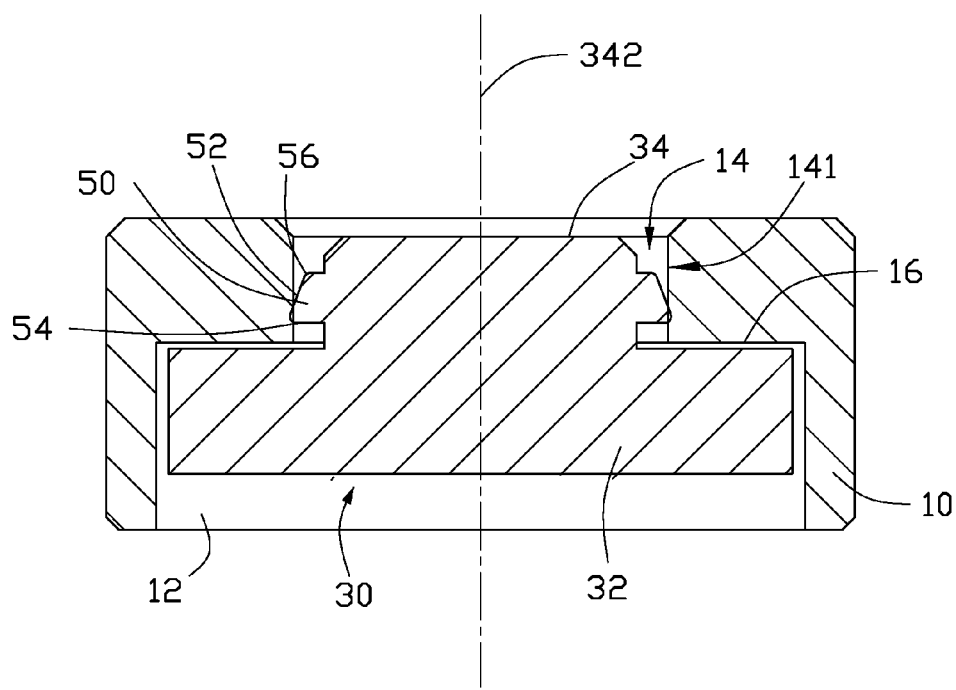
FIG. 4 is a cross-sectional view of the coaxial assembly taken along a line IV-IV of FIG. 1.

FIG. 4 illustrates that the second member 30 can be received in the receiving hole 12 and the assembly hole 14. The assembly portion 34 of the second member 30 can extend from the main body 32 toward the assembly hole 14, and coaxially received in the assembly hole 14. When the assembly portion 34 is inserted into the assembly hole 14, the guiding surface 52 can come into contact with one end portion of the assembly hole 14, and the movement of the assembly portion 34 can be guided. When the assembly portion 34 is received in the assembly hole 14, the abutting ends 54 can make an interference with the sidewall 141 of the assembly hole 14, thereby the assembly portion 34 can be positioned and fixed in the assembly hole 14, and the assembly portion 34 can be coaxial with the assembly hole 14. In other embodiments, the abutting ends 54 can tightly abut the sidewall 141 of the assembly hole 14, and do not make an interference with the sidewall 141.

In at least one embodiment, the position member 50 can be coupled to the assembly portion 34 by casting, welding, adhesive joints, or other mechanical joint. The position members 50 can also integrally formed with the assembly portion 34. In other embodiments, the number of the position members 50 can be two or more than two, and the position members 50 can be evenly arranged at lateral wall 341 of the assembly portion 34.

Figure 5:
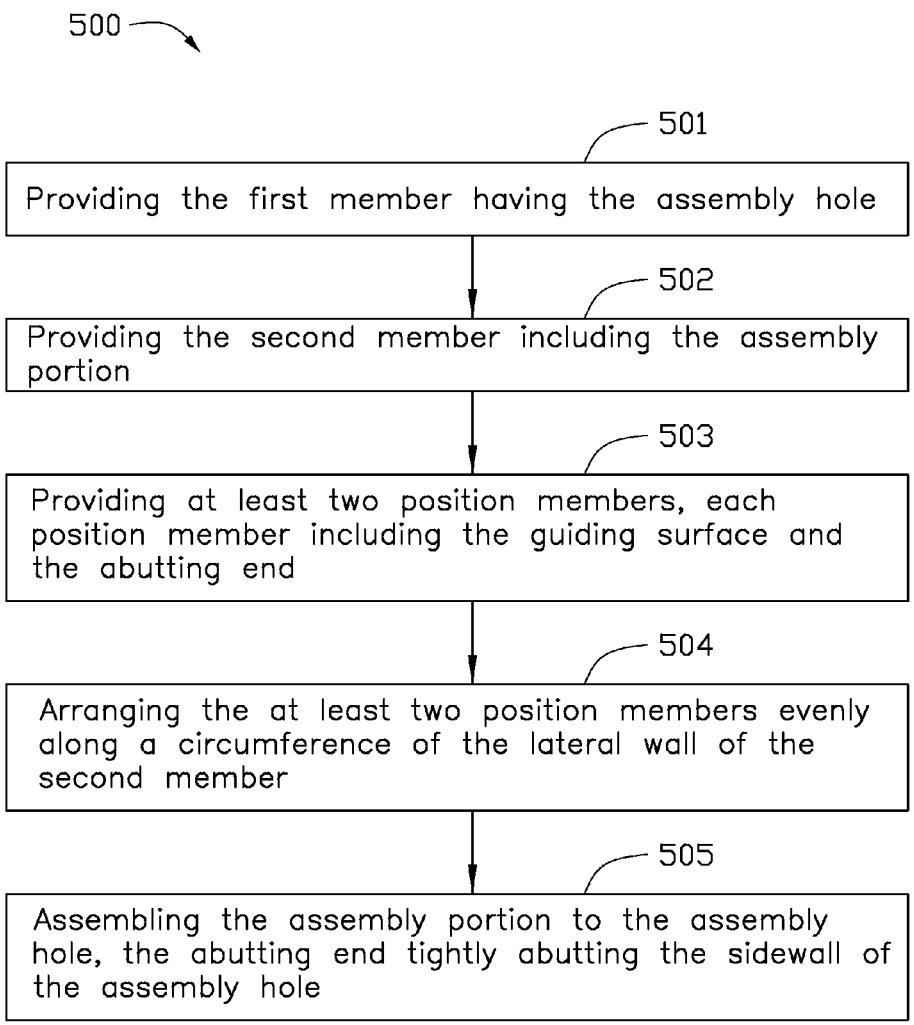
FIG. 5 is a flow chart of an assembly method of one embodiment.

Referring to FIG. 5, a flowchart is presented in accordance with an example embodiment which is being thus illustrated. The example method 500 is provided by way of example, as there are a variety of ways to carry out the method. The method 500 described below can be carried out using the configurations illustrated in FIGS. 1 through 4, for example, and various elements of these figures are referenced in explaining example method 500. Each block shown in FIG. 5 represents one or more processes, methods or subroutines, carried out in the example method 500. Furthermore, the illustrated order of blocks is by example only and the order of the blocks can change according to the present disclosure. Additional blocks may be added or fewer blocks may be utilized, without departing from this disclosure. The example method 500 can begin at block 501.

At block 501, the first member 10 with an assembly hole 14 can be provided.

At block 502, the second member 30 with an assembly portion 34 can be provided.

At block 503, at least two position member 50 can be provided. Each position member 50 can include the guiding surface 52 and the abutting end 54. The guiding surface 52 can be inclined with the central axis 342 of assembly portion 34, and the abutting end 24 can be formed at one end of the guiding surface 52.

At block 504, the at least two position members 50 can be evenly arranged at the lateral wall 341 along circumference of the assembly portion 34.

At block 505, the assembly portion 34 can be assembled into the assembly hole 14, and the abutting ends of the position members 50 can tightly abut the sidewall 141 of the assembly hole 14, thus the second member 30 can be coaxially mounted to the first member 10.

As the position members 50 can tightly abut the sidewall 141 of the assembly hole 14 or make an interference with the sidewall 141 of the assembly hole 14, the second member 30 can be coaxially mounted to the first member 10. The assembly is simple, and the assembly process is convenient. The first member 10 can be coaxial with the second member 30. The plurality of the position members 50 can have a same size and a same structure, thus the position members 50 can have a high manufacturing accuracy. Moreover, the position members 50 can be adapted to different kinds of the first member 10 and the second member 30, thus the production cost is low.

The embodiments shown and described above are only examples. Many details are often found in the art such as the other features of an coaxial assembly and an assembly method using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A coaxial assembly comprising:
   a first member defining an assembly hole, the assembly hole having a sidewall;
   a second member comprising a main body and an assembly portion extending from the main body, the assembly portion having a lateral wall; and
   at least two position members evenly arranged along a circumference of the lateral wall of the assembly portion, the at least two position members being distanced from each other, and each being wedge-shaped;
   wherein each position member comprises a guiding surface, an abutting end at one end of the guiding surface near the main body, and a guiding end of the guiding surface away from the main body, the guiding surface is a smooth surface diverging from the assembly portion, a distance between the guiding end and the assembly portion is smaller than a distance between the abutting end and the assembly portion, the guiding surface is inclined to a central axis of the second member and configured to guide a movement of the second member when being assembled into the assembly hole;
   wherein the second member and the assembly hole are configured such that when the second member is within the assembly hole, the abutting end of each position member tightly abuts the sidewall of the assembly hole, and the guiding end of each position member and the lateral wall of the assembly portion are spaced from the sidewall of the assembly hole, thereby causing the second member to be coaxial with the first member.

2. The coaxial assembly as claimed in claim 1,
   wherein the assembly portion is received in the assembly hole and has a central axis, and the position members are arranged at a sidewall of the assembly portion and positioned between the first member and the assembly portion.

3. The coaxial assembly as claimed in claim 2,
   wherein the first member further defines a receiving hole, and the receiving hole is coaxial with the assembly hole and in communication with the assembly hole; and
   wherein the main body is received in the receiving hole, thereby the assembly portion is assembled into the assembly hole.

4. The coaxial assembly as claimed in claim 1, wherein the position members are coupled to the second member by casting, welding or adhesive joints.

5. An assembly method comprising:
   providing a first member having an assembly hole, the assembly hole having a sidewall;
   providing a second member comprising a main body and an assembly portion extending from the main body, the assembly portion having a lateral wall;
   providing at least two position members, and arranging the at least two position members evenly along a circumference of the lateral wall of the second member, the at least two position members being distanced from each other, and each being wedge-shaped; and
   assembling the second member to the assembly hole;
   wherein each position member comprises a guiding surface, an abutting end at one end of the guiding surface near the main body, and a guiding end of the guiding surface away from the main body, the guiding surface is a smooth surface diverging from the assembly portion, a distance between the guiding end and the assembly portion is smaller than a distance between the abutting end and the assembly portion, the guiding surface is inclined to a central axis of the second member and configured to guide a movement of the second member when being assembled into the assembly hole;

wherein the second member and assembly hole are configured such that when the second member is within the assembly hole, the abutting end of each position member tightly abuts the sidewall of the assembly hole, and the guiding end of each position member and the lateral wall of the assembly portion are spaced from the sidewall of the assembly hole, thereby causing the second member to be coaxial with the first member.

6. The assembly method as claimed in claim 5, wherein the assembly portion is received in the assembly hole and has a central axis, and the position members are arranged at a sidewall of the assembly portion and positioned between the first member and the assembly portion.

7. The assembly method as claimed in claim 6, wherein the first member further defines a receiving hole, and the receiving hole is coaxial with the assembly hole and in communication with the assembly hole; and wherein the main body is received in the receiving hole, thereby the assembly portion is assembled into the assembly hole.

8. The assembly method as claimed in claim 6, wherein the position members are coupled to the second member by casting, welding or adhesive joints.

9. A coaxial assembly comprising:

a first member defining an assembly hole, the assembly hole having a sidewall;

a second member comprising a main body and an assembly portion extending from the main body, the assembly portion having a lateral wall; and at least two position members evenly arranged at a sidewall of the assembly portion, the at least two position members being distanced from each other, and each being wedge-shaped;

wherein each position member comprises a guiding surface, an abutting end at one end of the guiding surface near the main body, and a guiding end of the guiding surface away from the main body, the guiding surface is a smooth surface diverging from the assembly portion, a distance between the guiding end and the assembly portion is smaller than a distance between the abutting end and the assembly portion, the guiding surface is inclined to a central axis of the second member and configured to guide a movement of the second member when being assembled into the assembly hole;

wherein the second member and the assembly hole are configured such that when the second member is within the assembly hole, the abutting end of each position member make a interference with the sidewall of the assembly hole, and the other end of each position member and the lateral wall of the assembly portion are is spaced from the sidewall of the assembly hole, thereby causing the second member to be coaxial with the first member.

10. The coaxial assembly as claimed in claim 9, wherein the first member further defines a receiving hole, and the receiving hole is coaxial with the assembly hole and in communication with the assembly hole; and wherein the main body is received in the receiving hole, thereby the assembly portion is assembled into the assembly hole.

11. The coaxial assembly as claimed in claim 9, wherein the position members are coupled to the second member by casting, welding or adhesive joints.

* * * * *